United States Patent
Klemm et al.

(10) Patent No.: US 6,467,812 B1
(45) Date of Patent: Oct. 22, 2002

(54) PIPE HAVING REPLACEABLE WEAR RESISTANT LINED COUPLER

(75) Inventors: Robert E. Klemm; Gary D. Lehnhardt, both of Cedarburg, WI (US)

(73) Assignee: Construction Forms, Inc., Port Washington, WI (US)

( * ) Notice: Subject to any disclaimer, the term of this patent is extended or adjusted under 35 U.S.C. 154(b) by 1079 days.

(21) Appl. No.: 08/757,644

(22) Filed: Dec. 2, 1996

Related U.S. Application Data (63) Continuation of application No. 08/264,783, filed on Jun. 23, 1994, now abandoned.

(51) Int. Cl.$^7$ .................................................. F16L 55/00
(52) U.S. Cl. ............................. 285/55; 285/16; 285/112
(58) Field of Search .............................. 285/16, 17, 55, 285/112, 179, 915; 138/104, 96 R; 406/193

(56) References Cited

U.S. PATENT DOCUMENTS

| | | | | |
|---|---|---|---|---|
| 801,774 A | * | 10/1905 | Devonshire | 285/906 X |
| 1,211,784 A | | 1/1917 | Stuart | |
| 1,246,189 A | | 11/1917 | Vanderlip | |
| 2,766,518 A | * | 10/1956 | Costanzo | 285/112 X |
| 2,955,847 A | * | 10/1960 | McKenna | 285/16 |
| 3,794,359 A | | 2/1974 | Fisher | 288/55 |
| 3,834,965 A | | 9/1974 | Seiwert et al. | 156/294 |
| 4,095,825 A | * | 6/1978 | Butler | 285/915 X |
| 4,130,300 A | | 12/1978 | Sheridan | 285/16 |
| 4,251,170 A | | 2/1981 | Sheridan | 406/197 |
| 4,305,607 A | | 12/1981 | Westerlund et al. | 285/94 |
| 4,336,958 A | * | 6/1982 | Goetzinger | 265/55 |
| 4,653,777 A | | 3/1987 | Kawatsu | 285/16 |
| 4,659,118 A | * | 4/1987 | Schwyter | 285/55 |
| 4,684,155 A | | 8/1987 | Davis | 285/16 |
| 4,804,207 A | | 2/1989 | Berchem et al. | 285/16 |
| 4,865,353 A | | 9/1989 | Osborne | 285/16 |
| 4,883,292 A | * | 11/1989 | Kuroki | 285/55 |
| 4,991,876 A | * | 2/1991 | Mulvey | 285/915 X |
| 5,031,665 A | | 7/1991 | Chen et al. | 138/149 |
| 5,044,670 A | | 9/1991 | Esser | 285/16 |
| 5,188,396 A | | 2/1993 | Calvin | 285/16 |
| 5,244,237 A | | 9/1993 | Harvey | 285/55 |
| 5,275,440 A | * | 1/1994 | Esser | 285/55 X |
| 5,379,805 A | * | 1/1995 | Klemm et al. | 138/109 |
| 5,441,780 A | * | 8/1995 | Bushell et al. | 138/96 R |

FOREIGN PATENT DOCUMENTS

| | | | | |
|---|---|---|---|---|
| DE | 3814035 | * | 9/1989 | 406/193 |

* cited by examiner

*Primary Examiner*—Teri Pham Luu
(74) *Attorney, Agent, or Firm*—Andrus, Sceales, Starke & Sawall, LLP (57) ABSTRACT

A pipe section for concrete includes an end coupler interconnecting to another pipe section in a flow line. The coupler has an outer clamp secured extended from the pipe end with a coupling groove. An encircling clamp has sides located in the grooves of adjacent pipe sections to lock the pipe section together. The body and pipe end form an inner recess extending from the pipe end. An insert liner has a tubular portion matching the recess, with the outer surface of the tubular portion tapered to form a gap within the recess. The insert liner has an outer flange matching the outer diameter of the body and abuts the body. The inner wall of the liner has a central transition point from which the wall tapers inwardly in opposite directions to the outer end. The body member is formed of a high strength ductile steel. The insert liner is formed of a wear resistant material having a Rockwell hardness of 80 to 90. A carbide alloy consisting essentially of carbides, martensite, bainite and austenite, and 12–15% chromium, 2–3% carbon and traces nickel, molybdenum and austenite. A toughened ceramic is disclosed. The liner is adhesively bonded to the body using an epoxy adhesive which is responsive to heat for release of the liner. The liner is inserted by applying adhesive on the tubular portion and then pushing the liner into the recess.

24 Claims, 3 Drawing Sheets

PIPE HAVING REPLACEABLE WEAR RESISTANT LINED COUPLER

This application is a continuation of application Ser. No. 08/264,783, filed Jun. 23, 1994, now abandoned.

BACKGROUND OF THE INVENTION

This invention relates to a pipe having a replaceable wear resistant lined coupler and particularly to such pipe for carrying abrasive and wear creating materials, in particular, concrete.

Concrete pumping is used in placement of concrete in various applications. The present invention has been particularly applied to the concrete pumping technology but is equally applicable to other transport of highly abrasive material through a piping system. In concrete pumping as well as other abrasive material transport, excessive wear of the pipe is a common problem, and a special problem at the coupling of pipe sections, particularly where there is a change of flow direction.

In concrete pumping systems, initial pipe sections are interconnected to each other with releasable couplings. A typical system is disclosed in U.S. Pat. No. 3,705,737, which issued December, 1972 and U.S. Pat. No. 4,305,607 which issued Dec. 15, 1981, to the assignee of this invention. The couplings of the pipes generally in present technology include a releasable C-shaped clamp or the like with a sealing gasket located within the coupling to seal the joint between slightly spaced pipe ends. Thus, the pipe ends will normally be spaced slightly from each other and sealed by the outer special gasket structures. The pipe ends universally include an annular groove with the side edges of the clamp members fitting within the grooves, and locking the pipes to each other. Where a change of direction is required in the flow of the concrete, metal pipe elbows are connected to the straight pipe sections.

All of the pipe connections present areas which are particularly subject to significant wear as a result of abrasive characteristic of concrete, and will exist with other abrasive semi-solid flowing materials. The grooved areas of each pipe coupling presents areas of greatest weakness. Further, when the end coupling assembly is worn, the pipe section must be replaced. The elbows in the flow system also present a particularly severe area of wear at the outer elbow wall facing the oncoming stream of material as a result of the continuous engagement of the solid particles within the concrete or other fluid particle borne fluid moving into turning engagement with such wall. In the concrete pumping art and the like the releasable coupling system used as an industry standard creates a relatively weak wear area. The pipe coupling systems include a pipe end construction including the annular coupling groove. The coupling groove creates a substantially thinner wall in the pipe section configuration. In such standard coupling systems, a particularly severe problem of premature failure is thereby created in the area of the relatively thin wall. This type of coupling, however, has been used for many years, and is highly desirable because of many other reasons.

To minimize the necessity for frequent replacement of pipe sections and particularly elbows, the pipe may be specially formed with an inner wall to withstand an abrasive characteristic. Thus, the inner wall may be specially hardened or provided with a highly abrasive resistant inner liner. Various ceramic materials have in particular been used. An advantageous dual metal wall structure which provides a high, wear resistant inner liner is disclosed in the U.S. Pat. No. 5,097,585 which issued Mar. 24, 1992 to the assignee of this invention. The assignee of this invention has employed ceramic lining in the metal pipe sections including elbows. The liners are preferably constructed with the ceramic liner formed as individual segments which are adhesively mounted for replacement. This permits the repair of elbows which have been worn as a result of the abrasive characteristic in such a manner as to minimize the overall costs associated with the transport of abrasive materials.

The ceramic lined elbows and pipe, however, include a continuing problem of failure at the ends or interface area because of the turbulent flow characteristics and the physical restrictions created by the standard coupling configuration. In addition, a hard-face material has been welded within the pipe at the connections or couplings to increase the life at such critical areas. Although this process increased the life expectancy, the overall results were commercially disadvantages from the standpoint of costs in that the material and its application were expensive. Further, such structure is not adapted to cost effective field repair or replacement.

Other prior art has suggested other solutions. Thus, for example, U.S. Pat. No. 5,044,670 which issued Sep. 3, 1991 discloses an end liner or insert for interconnection to a pipe end in a concrete pumping system, the patent discloses an extended coupler member welded to the exterior of a metal pipe with the coupling member projecting outwardly from the pipe end. The member has an inclined circumferential wall or roof projecting outwardly from the pipe, with an insert clamped therein. The insert is replaceably clamped in the outer member in a positive locking and frictionally engaging manner. The insert projects inwardly of the diameter of the pipe and provides a reduced diameter opening for the inner connection of an elbow, or alternatively, an aligned common diameter between the insert and the downstream piping. The inwardly projecting insert is used to provide withdrawal of the insert for use of a suitable tool. In the common diameter structure, a gap is introduced between the insert and the end of the pipe to permit the removal of the insert member through the use of a suitable gap-engaging tool.

Thus, although the various problems have been well recognized and various solutions suggested and used, there is a continuing need for a more cost effective solution to the problem of the wear characteristic created by the flow of abrasive materials, particularly at pipe connecting joints.

SUMMARY OF THE PRESENT INVENTION

The present invention is particularly directed to a superior wear resistant pipe structure for carrying of high abrasive materials and particularly to an end insert of a superior wear-resistant construction and configuration and to the method of application. Generally, in accordance with the present invention, a special hard wear-resistant insert liner is formed of a special hardened material, such as a special carbide material, a special ceramic material or the like. The hard wear-resistant end insert liner is secured within a recessed end of the pipe and particularly in an end coupler section or member. The insert liner is, in one aspect of this invention, adhesively bonded in place and subject to release using heat or other operative energy field to soften or otherwise effectively release the adhesive and permit ready removal of the insert liner as well as the adhesive. This solution provides not only a rapid and cost effective formation of the pipe structure with the necessary wear resistant characteristic but permits quick inexpensive replacement of the insert liner.

In accordance with another feature of the present invention, the insert liner is specially constructed as a cast member with an exterior and internal surface to provide optimal casting while maintaining maximum hardened material within the coupling. Generally, the liner includes a fixed inner connecting or transfer area or section having a diameter which is preferably slightly less than the pipe diameter and with an inward taper from the outer end of the insert liner to such connecting section and an outward taper from such connecting section to the pipe.

More particularly, in one aspect of the invention, the insert liner is preferably formed by casting and particularly of a cast chrome-iron alloy which produces carbides of a high degree of hardness and preferably in a range of 80 to 90 Rockwell hardness. The alloy in one preferred embodiment includes significant chrome and carbon and traces of nickel, molybdenum and silicon. The cast chrome-iron alloy is an alloy having a microstructure that consists essentially of carbides, martensite, bainite and austenite. Various high toughened ceramic materials which have a Rockwell hardness in the range of 80 to 90 are available and are distinct from thermal insulating ceramics. The toughened ceramics can be used as the liner, but generally require preforming, machining and then firing. The present limitations on the ceramic casting technology limits the cost effective commercial usage of ceramic materials.

In another aspect of the present invention, the coupling end structure may be formed integrally with the pipe or as a separate coupler having a body member welded to the pipe.

The insert liner is generally formed as an L-shaped member having an outer flange adapted to abut the end of the body member of the coupler and an inwardly projecting tubular portion or member extended beneath the coupler and into abutting engagement with the end of the pipe. The outer diameter of the insert liner is tapered inwardly to define a slight but a distinct gap, which gap preferably increases from an outer portion of the tubular portion to the abutting pipe end. This increases the available space for the epoxy and provides optimum bonding characteristic, and allows easy insertion and removal. This feature further provides an improved casting characteristic. The leading edge or flange provides additional wear resistant material at the location of primary wear characteristics and also provides a mechanical interlock which will prevent the liner from dislodging and plugging the system in the event of excessive insert liner wear before replacement. The flange also minimizes casting time and requirements, creating a more round condition due to its configuration. The flange areas also permits the use of a puller or hammer to aid in removal of the insert liner, as well as providing a relatively strong outer wall so the insert liner can be tapped in with a hammer without breakage.

The present liner is equally applicable to any pipe section carrying highly abrasive materials including straight pipe sections, elbow sections, reducing sections and the like, and provides both a highly cost effective insert and additionally contributes to the useful operating life of the piping sections as a result of the convenient and relatively inexpensive field replacement.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DESCRIPTION OF THE ILLUSTRATED EMBODIMENT

Figures 1, 3, 4:
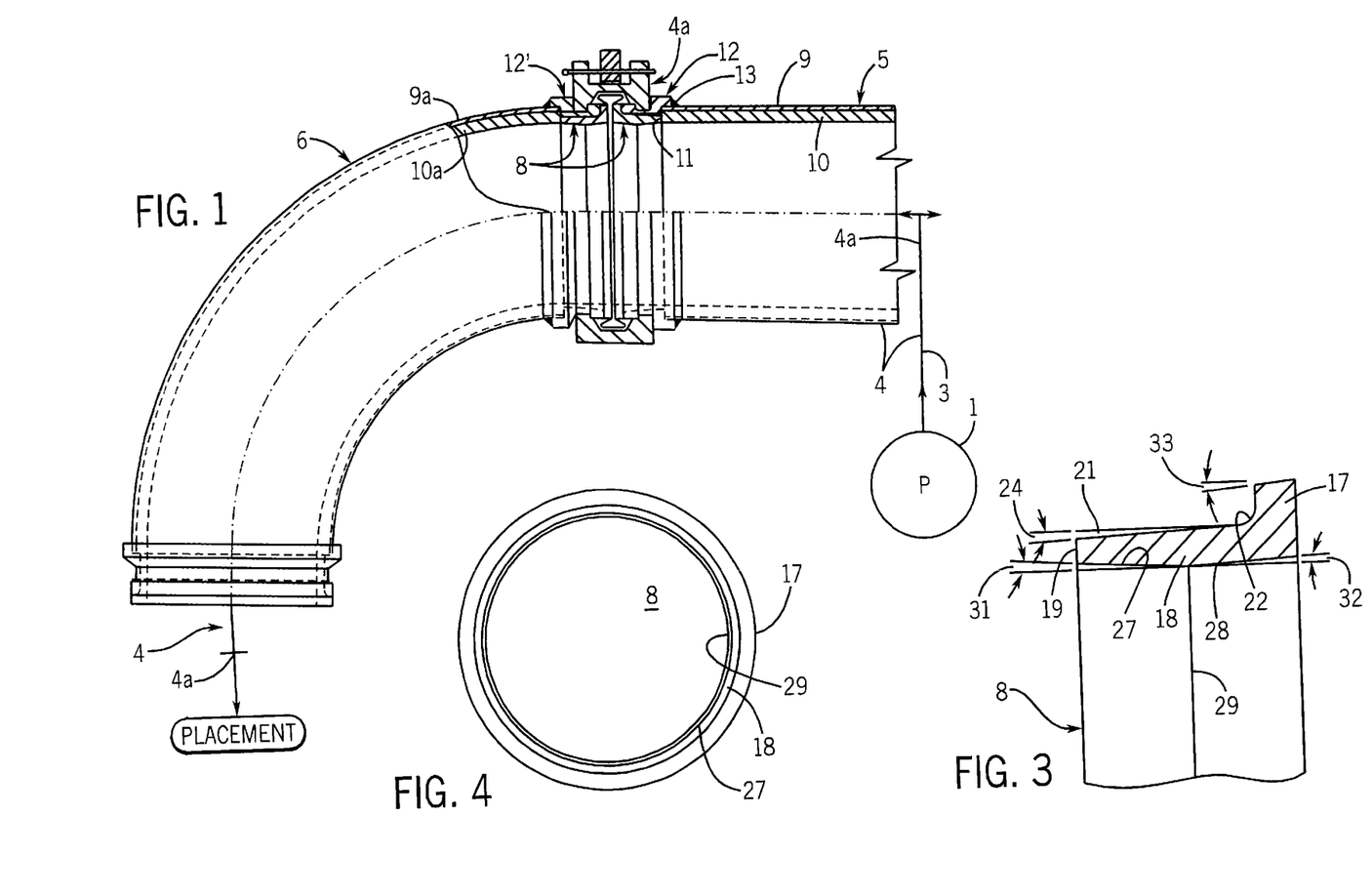
FIG. 1 is a side elevational view of a flow pipe structure including an elbow coupled to a straight line pipe with coupling ends constructed in accordance with the teaching of the present invention, and diagrammatically shown in a concrete pumping application, with parts broken away and sectioned to illustrate the interconnecting coupling structure.
FIG. 3 is a further enlarged sectional view of an insert liner to show internal detail of construction.
FIG. 4 is an end view of the insert liner.

Referring to FIG. 1, a diagrammatic illustration of a concrete pumping system is illustrated incorporating pipe sections constructed in accordance with the present invention and for purposes of illustration and description of the preferred embodiments of the present invention. In FIG. 1, a concrete pump 1 has a high pressure outlet for establishing concrete flow under a relatively high pressure for transport from a central location to one or more in placement locations. The flowline 3 connects the pump outlet to placement locations 3a in accordance with known constructions. The flowline 3 consists of a plurality of individual pipe sections 4 which are connected to each other in line-by suitable releasable couplings 4a. In FIG. 1, a straight pipe 5 and an elbow pipe 6 are illustrated in detail interconnected to each other by a coupling 4a. The pipe 5 and the elbow 6 with the interconnecting portion are more fully illustrated in FIGS. 2–4, with the coupling 4a including special end insert liners 8 secured in the pipe 5 and elbow 6 at the adjacent ends thereof. The insert liners 8 are specially constructed in accordance with the present invention to provide a highly significant improvement in the wear resistant characteristics of the pipe sections at the coupling 4a and thereby significantly minimize and avoid premature failure of the pipe or pipe end at the interconnecting junction of pipe sections, as more fully developed hereinafter.

Figure 2:
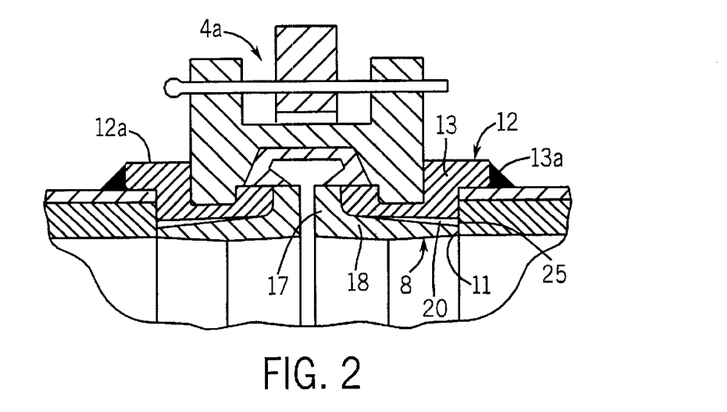
FIG. 2 is an enlarged fragmentary view of the pipe and coupler structure.

Turning particularly to FIGS. 2–4, the pipe 5 is shown has a constant diameter with the outlet end connected to the elbow 6. The pipe 5 is shown as a dual wall pipe having a relatively thin outer pipe portion or member 9 is a relatively high ductile steel. An inner pipe portion or member 10 has a substantially greater thickness and is formed of a hardened steel. Pipe member 10 is intimately affixed to the ductile pipe member 9. The pipes 9 and 10 terminate in a common end face 11. Such pipe is well known and is manufactured and sold by the assignee for a number of years. The elbow 6 is similarly formed with a corresponding outer ductile pipe 9a and an inner hardened pipe 10a.

In the embodiments of FIGS. 1–4, the ends of the pipe 5 and the elbow pipe 6 are constructed with a similar end connection for incorporation of and use of coupling assembly 4a.

Referring particularly to FIGS. 2 and 3, pipes 5 and 6 include identical end coupler units 12 and 12a, respectively.

Referring to the unit 12 which is attached to the pipe 5, the coupler unit 12 is connected to and forms an extension of the pipe 5. In this embodiment, unit 12 includes an outer body member 13 which is generally formed of a strong, ductile steel in accordance with known technology and which is recessed and extends in overlapping relation to the pipe 5. The body member 13 has an inner portion overlapping with and welded to the outer surface of pipe 5 as at 13a. The member thus projects inwardly into overlapping relation and abutting relation to the outer pipe 9 and outer portion of inner pipe 10 at the end face 11. The coupler member 13 projects longitudinally and axially from the pipe 5, with an outer portion having a substantially smaller circumferential outer diameter and illustrated slightly larger than the diameter of the pipe 5. An annular clamping recess or groove 14 is formed in the outer wall generally equally spaced between the outer end of the coupling member and the abutting common end face 11, and forms a pipe area 15 which is relatively the thinnest pipe wall which is not hardened in the system.

The coupling member 13 with the end of the pipe 5 defines a recessed pipe portion extending outwardly from the face 11 of inner pipe 10. In accordance with the illustrated embodiment of this invention, insert liner 8 is secured within such recess to define a special exceptionally wear resistant surface at the connection of the pipes 5 and 6.

The insert liner 8 is generally a tubular member having an L-shaped cross section as shown in FIGS. 1–3 and including an outer flange 17 and a tubular section 18 integrally formed as a single piece of a high wear resistant material. Tubular section 18 substantially matches the recess and extends into the recess defined by the coupling member 13 and the end of pipe 5, with the innermost end of the liner formed as a flat surface 19 (FIG. 3) abutting the common face 11 of pipe 5. Adhesive 20 is interposed between the circumferential interface of the coupling member 13 and the tubular section 18 of liner 8 to affixedly secure the insert liner within the coupler member 13. The adhesive 20 is specially selected to respond to heat or other energy field for releasing of the insert liner 8, as more fully developed hereinafter.

The flange 17 abuts the outer end of the coupling member 13 and has a thickness substantially matching the outer end.

The illustrated coupling member 13 has a constant inner diameter projecting outwardly from pipe 5. The outer circumference at surface 21 of the tubular pipe section 18 is an outer tapered surface, as most clearly shown in FIG. 3. The surface tapers inwardly from the rounded junction 22 to the end 19, as at 24, and forms a distinct gap 25 between the coupling member 13 and the outer surface of the insert liner 8. This gap 25 is filled with the adhesive 20. The tapered tubular portion is desirable in forming of a cast liner. The taper may be provided in whole or in part by providing a taper with the body member. The gap 25 promotes ready assembly of the insert liner 8 to the pipe 5 and avoids consideration with respect to providing adequate adhesive for affixing the insert liner 8 to the pipe 5. As previously noted, with resent day technology, the adhesive 20 is a known epoxy resin which bonds a carbide liner firmly within the end coupler, and readily responds to heat to return to molten state. The part can then be readily removed, the surfaces cleaned and a new liner installed. Thus, an epoxy resin is applied to the tubular portion and the insert liner pushed into the coupling member 13, in the same manner as an initial installation. The tapered outer wall allows use of ample epoxy on tubular portion to insure proper bonding of the liner to the coupling member in a rapid and cost effective procedure. The epoxy adhesive ensure holding of the liner in place if for any reason a part thereof may be broken off, while allowing ready removal when needed. In summary, any suitable adhesive may be used, but the adhesive is preferably responsive to heat or other energy field for releasing of the part for repair while firmly holding the liner in place when pumping concrete. Further, with illustrated construction, a slip fit might be used. Upon initially pumping of concrete, the gap between the pipe ends and thus the flanges 17 of liner 8 is filled with concrete which hardens and serves to mechanically support the liners. The mechanical support is inferior to the bonded support because of the increased retention characteristic of the bonding, but can be used within the teaching of the present invention.

The inner wall of the insert liner 8 is also preferably and uniquely formed as shown in FIGS. 2–4. As more clearly shown in FIG. 3, the inner wall has an outer end portion 27 and an inner end portion 28 connected at a common transfer or connecting area 29 shown as a common connection line 29. The outer end portion 27 has a diameter at the outermost end which is slightly less than the common transition line 29. A taper is provided on the outer end portion tapering inwardly to the common transition point 29, as at 31. The inner portion 28 includes a reverse or outwardly extended taper from the common line 29 to the end face of the liner 8, as at 32. The outermost diameter of portion 28 substantially corresponds to the internal diameter of the pipe 5.

The outer wall or face of the flange 17 also has a slight taper, as at 33, tapering inwardly from the outer face of the flange such that its surface is slightly inwardly of the outer face of the adjacent body member 13. The several tapers may be of the same angle and promote low cost casting of the liner. The inner surface of insert liner 8 with the dual inclination minimizes excessive thinning of the liner wall at either end which allows the proper flow of the concrete.

The coupler unit 12a has the same structure and is secured to the elbow pipe 6 projecting outwardly therefrom into alignment with the coupler unit 12. The conventional clamp structure secures the pipe ends to each other as shown.

Thus, the portion of the insert liner 8 adjacent the outermost end of the coupling members 13 and 13a is the area of greatest wear due to the turbulence in the flow characteristic at the connecting location and the physical restrictions on the coupling construction. Thus, flanges 17 and the inner surfaces 27–29 of the liner extend with a proper flow characteristic and cross section to provide a maximum wear surface with a reduction in the transition point and provides a greater volume of wear resistance material at the transfer point between the pipe sections while minimizing turbulence and promoting smooth movement of the material between the pipes. The construction tends to avoid sharp offset edges and the like such as increases both turbulence and resulting wear.

In the present invention, the insert liner 8 is formed of a highly abrasion resistant material and preferably formed of a unique cast iron alloy or a cast ceramic material. The insert liner preferably is formed having carbides with a hardness in the range 80 to 90 Rockwell. Thus, a hardened steel pipe will generally have a hardness of 50 to 60 Rockwell. Weld deposited hardened surfaces having carbides of an 80 to 90 Rockwell hardness can be deposited by welding processes. Applicant has found that a chrome iron alloy of a martensite structure produces a castable material having carbides of 80 to 90 Rockwell hardness. The alloy contains significant amounts of chromium carbide spheres or particles. The hardened alloy is of a martensite structure with the interconnecting internal structure and in addition, includes particles or beads of hardened chromium carbide interspersed throughout the hardened material. Although a simple Rockwell indentation test may indicate a hardness in the range of 50 to 60 Rockwell, in fact the carbide hardness is in the range of 80 to 90 Rockwell. The hardened alloy is adapted to conventional known casting technology and is thus particularly useful in cost effective fabrication and forming of insert liners for coupling of pipe sections. In a practical commercial application, an iron alloy contained 15–20% chrome, 2–3% carbon and traces of nickel, molybdenum and silicon with the balance iron. The particular alloys have a microstructure that consists of carbides, martensite, bainite and austenite. The alloys are conveniently cast as an insert liner at a cost permitting implementation of the liner in commercial couplings systems. Applicant has found that a particularly unique and cost effective cast iron alloy contains 15 to 20 percent chrome, 2 to 3 percent carbon and traces of nickel, molybdenum and silicon and the balance iron. The alloy has a microstructure that consists essentially of carbides, martensite, bainite and austenite. The material is readily adapted to cost effective casting of a liner and has a long operating life. In addition, the material readily bonds to the steel body member using an epoxy resin. Though highly toughened ceramic materials are currently available with present materials and technology and insert liners can be formed to provide highly significant improvement in life of the coupling, but technical limitations associated with the ceramic casting process results in the final product as cost prohibitive when compared, for example, with the carbide alloys and the like.

Each of the illustrated embodiments of the invention with the replaceable insert liner having the flange structure provides a leading edge which provides maximum abrasive resistant material for encountering the turbulent flowing concrete and provides a maximum wear resistance. The flanged leading edge prevents dislodging of the liner 8 and plugging of the system even with a severely worn insert liner during use. The leading edge structure also allows for use of a puller to be attached for removal of the insert liner. Additionally, the carbide liner is a relatively brittle member and can be broken by hammering or like application of sufficient force. The large flange 17 also permits improved assembly by permitting ready tapping of the leading edge of the insert liner into place without breakage thereof. The force required is significantly less than that which results in shattering such as required in removal. Thus, the insert liner 8 when formed with the preferred materials is subject to forced breakage when worn but is sufficiently strong to allow tapping into place with a hammer or other like instrument. The tapered shape of the insert is conducive to cost effective molding or casting of the part with the tapered shape which can be readily inserted and removed. In addition, the tapered shape creates a space for the epoxy or other adhesive thereby minimizing concern for appropriate adhesive with respect to thickness, quantity and the like. In assembly, an epoxy adhesive is applied to the tubular member and is pushed into the coupler member with the epoxy adhesive filling the total gap to produce a strong, long life attachment.

The insert liner of the present invention is particularly desirable and unique in providing a very readily field replaceable and thereby repairable part for the total maximum life of the pipe section. The use of a heat responsive epoxy as the adhesive 20 is particularly desirable in providing low assembly cost as well as cost effectiveness field replacement and repair. Thus, it is merely necessary to apply a suitable torch such as a propane or acetylene torch, or other heat source, to the coupler member 13 to soften the adhesive 20 and thereby promote the rapid and effective rapid removal. The insert liner provides the maximum wear resistant material immediately aligned with the very thin coupler portion in the illustrated embodiments of the invention.

Various variations in the coupling assembly can be made for connecting the pipe sections.

Figure 5:
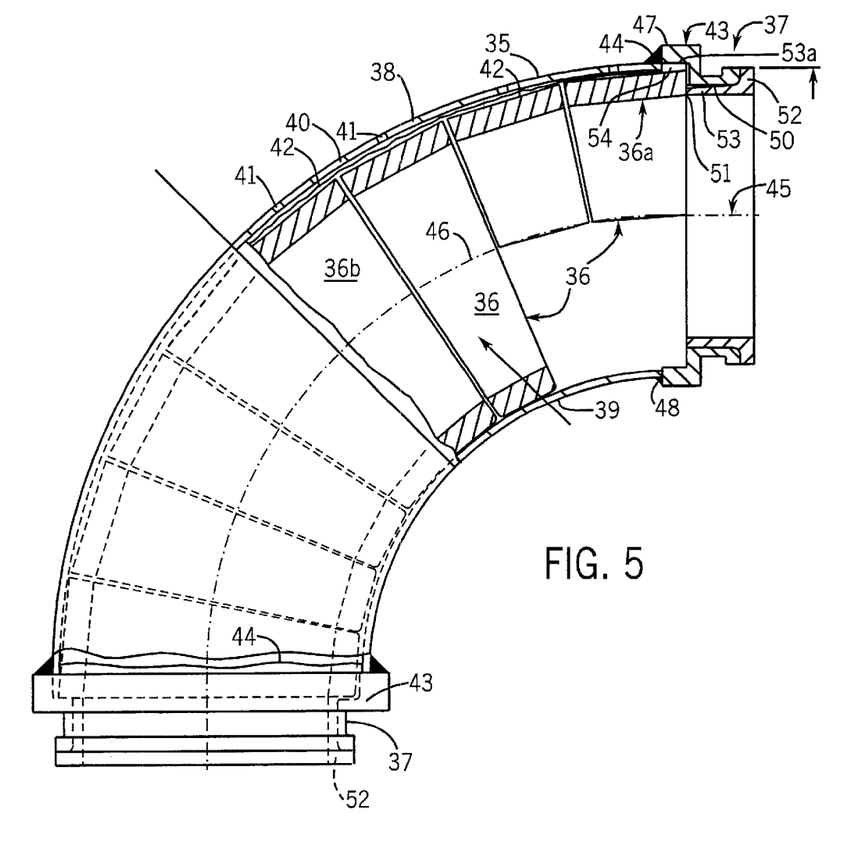
FIG. 5 is a view showing the insert liner applied to an alternate elbow construction including a cast elbow lining utilizing either cylinders or segments, either of ceramic or of a high chrome wear resistant iron material.

FIG. 5 illustrates a further embodiment of the invention applied to a pipe elbow with cast liner segments secured within the elbow. In this embodiment, the elbow is formed with an outer ductile pipe 35 which is lined throughout the length of the pipe with liner segments 36. The segments 36 are formed of a high wear resistant material such as a ceramic or a wear resistant iron, such as that described for liner 8. The segments 36 may be cylindrical or may be applied only to the outer 180°. They are bonded to the inner surface of the elbow 35. The end segments 36a project outwardly of the pipe end into coupler units 37.

The liner segments 36 may take various forms. Thus, for purposes of illustration and description, two different liner constructions are illustrated in FIG. 5. A plurality of 360° segments 36b are illustrated. The segments consists of a constant diameter outer circular wall surface 38 and have an axial extent which includes a small portion of the total length. The segments 36b have a generally converging cross section from the outer side of the elbow to the inner side. The outer sides span a corresponding greater circumference of the outer side of the pipe compared to that of the inner side in accordance with the difference in the total lengths at outer and inner sides. In the illustrated embodiment of the invention, the segments 36 abut the inner surface of the inner side with a slight gap or space 39 to the opposite sides of the point of engagement. The outer wall of the segment 36b is spaced slightly from the inner surface wall of the pipe as at 40. Openings 41 are provided in the outer wall of the pipe 35 generally aligned with the center of each 360° segment 36. As a result of the segmental construction, a slight gap 43 is developed between the segments particularly outwardly of the inner wall. Suitable epoxy 42 is injected into the pipe to adhesively bond the segments 36 in place. The adhesive is injected under pressure and encloses and fills the gaps about the segments and the pipe wall.

In addition to a 360° segment, certain pipes may be lined with 180° segments 36a filling only the outer half wall of the elbow. With this structure, elbow 35 may be specially shaped such that the elbow has a constant diameter equal to the distance between the inner wall of the elbow 35 and the inner wall of ceramic liner 36a. The 180° segments are similarly bonded in location within the elbow 35, with end units 36a projecting into the coupler unit 37.

Referring to FIG. 5, the opposite ends of the elbow 35 are provided with corresponding coupling units or structures 37. As in the first embodiment, the coupling unit 37 includes a body member 43 welded or otherwise firmly affixed to the end of the elbow 35 as at 44 and extending longitudinally outwardly as an extension of the outlet end of the 90° elbow. The center line 45 of the coupler is tangent to the radius line 46 of the elbow at the exit location.

In this embodiment, the body portion or member 43 includes a somewhat larger connecting end portion 47 which is secured as an annular ring with end face 48 abutting the end of elbow 35. The inner surface of the ring portion 47 is located to the end edge of the elbow at the major radius, as shown. At the minor or inner radius, an intermediate portion of the end face 48 abuts the pipe end. Weld 44 interconnects the body portion fixedly to the pipe 35.

A gap is developed about a portion of the body and the ceramic segment which is secured within the pipe at the terminal end. This provides a firm fixed support of the coupling body to the pipe and the pipe ceramic lining.

The member 43 includes an extended body portion 50 which includes clamping recess to secure a coupling unit. The body portion 50 is stepped inwardly generally into alignment with a center portion of the ceramic liner 36 at the outer periphery and with an elbow liner at the inner periphery or radius if a 360° segment is used. The extended body 50 is located to abut the end 51 of the elbow liner 36a and forms an insert liner securing recess.

An insert liner 52 has an L-shaped configuration with outer tapered circumference in the tubular portion 53. Epoxy adhesive fills the gap for interconnecting of the liner 52 into the body portion 43. The inner configuration of the body portion and the outer circumferential configuration of the elbow liner are spaced to form a gap 53a which is also filled with epoxy adhesive to firmly interconnect the body member 50 in place.

In the illustrated embodiment, the liner 52 has a tapered inner surface extending from the outer flange to the innermost end 51 of the tubular portion. The liner diameter essentially corresponds to the main incoming pipe to which the elbow is to be connected. In this embodiment, of course, the flow into the elbow is generally directed to the back or outermost side and flow through the pipe along such radius engaging the elbow liner 36.

The insert liner 52 is adhesively bonded for ready replacement in accordance with the manner similar to that described with the first embodiment. Thus, heating of the body member and/or liner will soften the adhesive to allow more ready removal of the liner. Further, the thin cross section of a worn liner may be sufficiently brittle so that it can be removed by striking hard blows sufficient to break the member apart and then remove any additional body portions secured to the body member by further heating of the members to soften the adhesive for ready removal.

Figure 6:
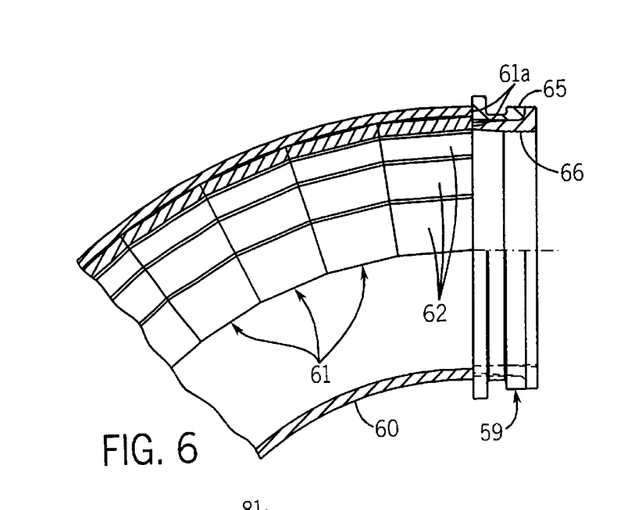
FIG. 6 is a fragmentary view similar to FIG. 5 illustrating an alternate embodiment of a ceramic lined elbow with the replaceable insert liner.

FIG. 6 illustrates a ceramic lined elbow with a slightly different embodiment of a coupler 59 is illustrated. In FIG. 6, the elbow includes an outer pipe 60 spanning 90°. In this embodiment, only the outer side of elbow 60 is provided with a flat, ceramic tile. In this instance, the ceramic lining includes a series of generally abutting tiles 61 extending throughout outer side of the pipe, and terminating in alignment with the pipe end 61a. Each tile 61 is formed of a plurality of circumferentially spaced blocks 62. Again, the tiles 61 are adhesively bonded in position. The elbow 60 is preferably specially shaped with the outer half of a larger diameter than the inner half such that a constant diameter opening is formed between the tile and the inner side of the pipe.

The coupler 59 again is formed of a body member 65 firmly attached to the pipe end in combination with an insert liner 66. The body member 65 is a U-shaped member with a flat attachment wall abutting the end of the pipe 60 and the end ceramic liner 61. The body member 65 extends outwardly with the outer portion of a reduced diameter and including the clamping recess. The inner surface of the body member is constant diameter and with the surface alignment with liner and the inner surface of the inner side of the pipe 60. The insert liner 66 is constructed essentially as shown in the first embodiment. This again provides for an essentially optimal transfer with a maximum availability of the insert liner material to the incoming concrete as it flows into and from the lined elbow.

Figure 7:
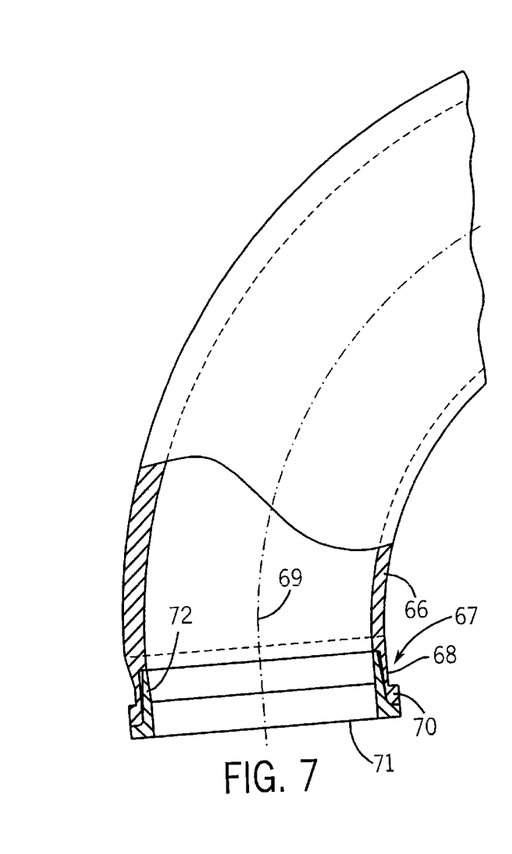
FIG. 7 is a fragmentary view of a cast elbow with a removable insert liner.

FIG. 7 is a view of an elbow formed of a single cast elbow with an integrally formed elbow 66 and coupling ends 67. The elbow 66 has a relatively thin wall at the inner side at the minimum radius and an outer thick wall at the outer side and the maximum outer radius. The coupling ends of the pipe within which a coupling recess 68 is formed extend tangentially to the center radius line 69 of the elbow 66. The incoming material is thus projected inwardly toward the outer thick wall.

The integrally formed coupler includes the recess 68 which extends circumferentially about the pipe and is set inwardly from the pipe end face. The recess thus defines an outer extending body member 70 on the end of the pipe to receive a clamp unit. The inner surface of the pipe is recessed as at 71 shaped to receive an insert liner 72. The insert liner is again adhesively bonded in place and is illustrated of a construction corresponding to that shown in the embodiment of FIG. 1.

The unit thus present a maximum wear resistant insert liner immediately adjacent to the incoming stream and with direction of the material into the plate. The liner is again replaceably mounted.

Figure 8:
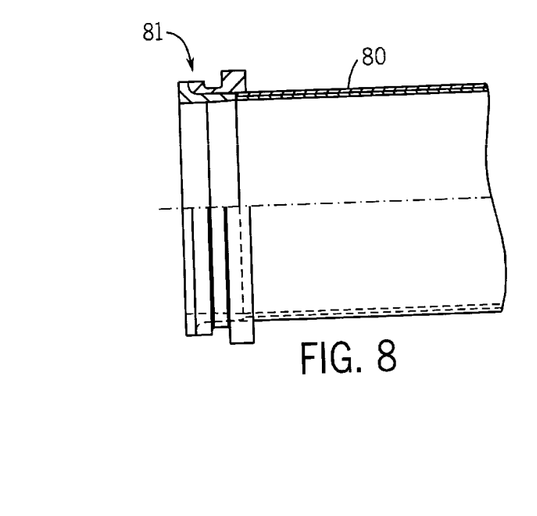
FIG. 8 is a view of an in-line straight boom section tube or a reducing tube section.

In FIG. 8, a typical concrete placement boom tube 80 for a truck mounted concrete pumping unit is illustrated. The illustrated boom tube 80 is a straight pipe member shown as a dual wall pipe. The boom tube can be a constant inside diameter or a continually tapered diameter for size transitions. Boom tubes are also formed of a single wall construction having a somewhat greater thickness to maintain a similar strength. The boom tube is formed generally in the same manner as that described with respect to the concrete line shown in FIG. 1. A coupler unit 81, constructed as in the first embodiment, is secured to the boom tube end. The insert liner is again shown abutting the end of the pipe, as shown also in FIGS. 1 and 2.

As previously noted, the present invention is particularly directed to both the structure and method of forming a pipe with special coupling end structure for carrying of abrasive material and particularly concrete and the like, and to the method of forming such coupler and interconnection to the pipe section. The illustrated embodiments are preferred structures which have been developed for commercial implementation. Variations in the construction and method may be made within the scope of the invention as defined in the claims. Thus, the flanged structure is preferred but not essential and although the releasable adhesive bonded insert is considered a particularly significant advance in the art, other securement devices and systems may be used for hardened liner of the disclosed material structure.

The following claims describe the various individual features of this invention including the interconnection of the coupler with the thin coupling recessed portion in combination with an insert liner, the special formation of the insert liner for ease of insertion and removal and the construction of the insert liner to provide the maximum or optimal distribution of the wear resistant material at the coupler and with respect to the flowing material, and the hardened liners of the cast special carbide alloy and ceramic materials, as well as other features heretofore disclosed herein.

Various modes of carrying out the invention are contemplated as being within the scope of the following claims particularly pointing out and distinctly claiming the subject matter which is regarded as the invention.

We claim:

1. A pipe unit for releasable connection of one pipe member to a second pipe member in a concrete pumping line for carrying concrete, comprising:

a steel pipe member having a hardened inner wall for carrying concrete, an outer body member secured to one end of said one pipe member and having an external circumferential coupling groove for receiving a coupler unit for interconnection of said one pipe member to said second pipe member, said body member and said one pipe member defining an inner recess extended outwardly of the pipe member, an insert liner having a tubular portion located within said substantially matching said inner recess, said insert liner having an outer locating and abrasive resistant end flange abutting the end of said body member, and an epoxy adhesive between said tubular portion and said recess and bonding said liner to said body member, said epoxy adhesive releasing said liner in response to heating said epoxy adhesive, said inert liner being a cast member of a wear resistance iron chrome alloy and providing a surface highly resistant to the abrasive force of concrete.

2. The pipe unit of claim 1 wherein said iron-chrome alloy has a microstructure consisting essentially of carbides, martensite, bainite and austenite.

3. The pipe unit of claim 2 wherein said iron alloy consists essentially of 12–15% chromium; 2–3% carbon and traces of nickel, molybdenum and austenite.

4. The pipe unit of claim 2 or 3 wherein said liner including said tubular portion and said flange is an integral single piece cast member.

5. A coupler connected to a first steel pipe section having a hardened inner wall and a coupling end for interconnecting the first pipe section to a second pipe section for carrying of an abrasive concrete material, each said pipe sections having at least one coupling end, said coupler comprising:

an outer body member having a first end fixed to the coupling end of the first steel pipe section and having an outer end defining the outermost end of the first steel pipe section, said body member having an inner diameter forming an inner recess portion extended outwardly of the coupling end of the first steel pipe section, an insert liner of an abrasive resistant material resistant to the abrasive force of the concrete and having a tubular portion with an outer circumference generally conforming to said inner diameter of said body member for insertion into said recess portion with a substantial interface therebetween, said insert liner including an outer abrasive resistant end flange engaging the outer end of the body member and locating the inner end of the tubular portion with respect to the first end of the outer body member, and a releasable interface bonding material connecting said liner to said body member substantially through said interface and firmly securing the liner in place for concrete transport and removable without disruption of said body member for replacing the liner.

6. The coupler of claim 5 wherein said tubular portion matches and substantially fills said recess.

7. The coupler of claim 6 wherein the outer body member is formed of a high strength ductile steel, said insert liner being formed of a wear resistant material selected from an iron-chromium alloy microstructure consisting essentially of carbides, martensite, bainite and austenite.

8. The coupler of claim 6 wherein said liner is formed of brittle material and is further removable by breaking said brittle liner and said releasable interface bonding material.

9. The coupler of claim 5 wherein said releasable interface bonding material includes an adhesive between said tubular portion and said body member, and said adhesive being responsive to heat to loosen said bond for removing said liner from said body member.

10. The coupler of claim 9 wherein said outer wall of said tubular portion tapers from said outer end to said first end and forms an increasing gap between the tubular portion and the body member, said gap containing said adhesive.

11. The coupler of claim 5 wherein said outer wall of said tubular portion and the opposed wall of said body member are constructed and arranged to define an adhesive receiving gap therebetween.

12. The coupler of claim 5 wherein said tubular portion includes an inner wall having a substantially central portion having a diameter substantially matching the diameter of said pipe section, said inner wall tapering outwardly therefrom to the opposite ends of the tubular portion to form increasing gaps to the opposite sides of said central portion.

13. The coupler of claim 5 wherein said liner is a toughened ceramic.

14. A coupler for connecting a first steel pipe having a hardened inner wall to a second pipe for transport of a highly abrasive material, comprising a coupling member having an outer clamping projection and for securement to the first steel pipe end with said clamping projection axially spaced from the steel pipe and having an inner tubular recess of a diameter greater than the inner diameter of said steel pipe, and a wear resistant liner secured within said recess with a continuous interface between said liner and said coupling member and a flange abutting the end of the coupling member and forming an abrasive resistant end face, and a heat responsive adhesive interposed within said continuous interface between said coupling member and said liner, said liner including said flange formed of an abrasive resistant material.

15. The coupler of claim 14 wherein said liner is a cast from an iron-chrome carbide material.

16. The coupler of claim 14 wherein said liner is an iron alloy consisting of substantial chrome, minor carbon, and traces of nickel, molybdenum and silicon and the balance iron.

17. The coupler of claim 14 wherein said liner is an iron alloy liner consisting of 12–15% chrome, 2–3% carbon and traces of nickel, molybdenum and silicon and the balance iron.

18. The coupler of claim 14 wherein said liner is a toughened ceramic.

19. A removable flanged insert liner for adhesive bonding within a steel pipe having a hardened inner wall and having an inner recessed end with an inner recessed diameter, comprising a tubular body having an end flange extending substantially radially outwardly of said tubular body, said tubular body having an outer surface having a first portion corresponding to said recess diameter and a second portion adjacent said first portion with a lesser diameter than said recessed diameter to form an adhesive receiving gap between said recessed end and said second portion of said tubular body for receiving an adhesive and thereby securing said liner in said recessed end, said adhesive and said liner being removable from said steel pipe for replacement of said liner and said adhesive.

20. The liner of claim 19 wherein said inner recessed diameter has a substantially constant diameter throughout the length of the inner recess, and said first portion is located adjacent said flange, said outer surface of said tubular body tapers radially inwardly from said first portion to form said gap.

21. The flanged insert liner of claim 19 wherein said tubular body has an inner surface including a diameter less than the pipe diameter at the flange and tapering inwardly from the flange to a connecting portion having a diameter corresponding to the recessed diameter and tapering outwardly therefrom to a diameter matching the diameter of said steel pipe.

22. A liner unit to be secured within an end body member secured to the end of a pipe for carrying an abrasive fluid material comprising a cast member of a wear resistant iron alloy having a microstructure consisting essentially of carbides, martensite, bainite and austenite.

23. The liner of claim 22 wherein said cast member has a composition consisting of 15–20% chrome, 2–3% carbon and traces of nickel, molybdenum and austenite and the balance iron.

24. The liner of claim 22 wherein said cast member has a composition consisting of chrome, carbon and traces of nickel, molybdenum and austenite and the balance iron.

* * * * *